US009366293B2

(12) United States Patent
Gessendorfer et al.

(10) Patent No.: US 9,366,293 B2
(45) Date of Patent: Jun. 14, 2016

(54) CAGE SEGMENT OF A TAPERED ROLLER BEARING, AND TAPERED ROLLER BEARING

(75) Inventors: Matthias Gessendorfer, Unterspiesheim (DE); Baozhu Liang, Dittelbrunn-Hambach (DE); Winfried Oestreicher, Schwebheim (DE); Ralf Wahler, Bergrheinfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 75 days.

(21) Appl. No.: 13/991,593

(22) PCT Filed: Dec. 7, 2011

(86) PCT No.: PCT/EP2011/072027
§ 371 (c)(1),
(2), (4) Date: Sep. 17, 2014

(87) PCT Pub. No.: WO2012/076583
PCT Pub. Date: Jun. 14, 2012

(65) Prior Publication Data
US 2015/0078699 A1    Mar. 19, 2015

(30) Foreign Application Priority Data
Dec. 7, 2010    (DE) .......................... 10 2010 062 526

(51) Int. Cl.
*F16C 33/51*    (2006.01)
*F16C 19/36*    (2006.01)
*F16C 33/46*    (2006.01)

(52) U.S. Cl.
CPC .............. *F16C 33/51* (2013.01); *F16C 19/364* (2013.01); *F16C 33/4605* (2013.01); *F16C 33/467* (2013.01); *F16C 33/4676* (2013.01); *F16C 33/4682* (2013.01); *F16C 33/513* (2013.01); *F16C 2240/40* (2013.01); *F16C 2300/14* (2013.01); *F16C 2360/31* (2013.01)

(58) Field of Classification Search
CPC .. F16C 19/364; F16C 33/4605; F16C 33/467; F16C 33/4676; F16C 33/4682; F16C 33/51; F16C 33/513
USPC .................................. 384/568, 571, 578, 580
See application file for complete search history.

(56) References Cited

U.S. PATENT DOCUMENTS

| 1,327,003 | A | * | 1/1920 | Wilson | ..................... F16C 19/30 |
| | | | | | 384/580 |
| 1,444,964 | A | * | 2/1923 | Foster | ..................... F16C 19/34 |
| | | | | | 384/571 |
| 2,969,267 | A | | 1/1961 | Gothberg | |

FOREIGN PATENT DOCUMENTS

| DE | 1400317 A1 | 10/1968 |
| DE | 19960542 A1 | 8/2000 |

(Continued)

*Primary Examiner* — Phillip A Johnson
(74) *Attorney, Agent, or Firm* — Bryan Peckjian; SKF USA Inc. Patent Dept.

(57) ABSTRACT

A tapered roller bearing includes cage segments each having a pocket that retains one conical rolling element. The pocket is formed by two mutually-opposing circumferential bridges, which each extend between first and second circumferential ends of the cage segment, and at least two mutually-opposing connecting bridges, which connect the two circumferential bridges. The circumferential and connecting bridges have pocket sides, which delimit the pocket. The connecting bridges disposed in the region of the first and second circumferential ends each have a concavely-shaped first guide surface on their pocket and circumferential sides that partially enclose one rolling element. When a rolling element is disposed between the first circumferential end of one cage segment and the second circumferential end of the adjacent cage segment, the circumferential bridges of the two adjacent cage segments do not touch during operation.

20 Claims, 4 Drawing Sheets

(56) References Cited

FOREIGN PATENT DOCUMENTS

| DE | 10246825 A1 | 4/2004 |
| DE | 102005009980 B3 | 6/2006 |
| JP | 2005076674 A | 3/2005 |
| JP | 2007211833 A | 8/2007 |
| JP | 2007247819 A | 9/2007 |
| JP | 2007285415 A | 11/2007 |
| JP | 2008064248 A | 3/2008 |
| JP | 2008082380 A | 4/2008 |
| JP | 2008256086 A | 10/2008 |
| JP | 201009314 A | 1/2010 |

* cited by examiner

CAGE SEGMENT OF A TAPERED ROLLER BEARING, AND TAPERED ROLLER BEARING

CROSS-REFERENCE

This application is the U.S. national stage of International Application No. PCT/EP20111072027 filed on Dec. 7, 2011, which claims priority to German patent application no. 10 2010 062 526.4 filed on Dec. 7, 2010.

TECHNICAL FIELD

The invention relates to a cage segment of a tapered roller bearing. Furthermore, the invention relates to a tapered roller bearing for rotatably supporting a first machine part relative to a second machine part, in particular for rotatably supporting a rotor shaft of a wind turbine.

RELATED ART

Such a cage segment is known from DE 10246825 A. The end surfaces of the known cage segments can be disposed one after another in a row, so that with a relatively low expenditure a cage can be formed which is suited in particular for use with very large rolling-element bearings having relatively small rollers.

A cage segment, which includes a solid lubricant, is known from JP 2008082380 in order to fix the rolling elements to the cage segment.

Given the increasing demand for ever-larger rolling-element bearings, for example for wind turbines, cage concepts are required for ever-higher mechanical loads. The weight of the rolling elements used also increases ever more with the size of the rolling-element bearing, so that ever-more-stable cage assemblies are required for this reason as well.

SUMMARY

In one aspect of the present teachings, a cage design is disclosed which is suited for use in very large rolling-element bearings, for example, in a rolling-element bearing of a wind turbine.

The inventive cage segment of a tapered roller bearing includes two mutually opposing circumferential bridges, which each extend between a first circumferential end and a second circumferential end of the cage segment. Furthermore, the cage segment includes at least two mutually opposing connecting bridges, which connect the two circumferential bridges to each other and form, together with the circumferential bridges, at least one pocket for accommodating a conical rolling element. The circumferential bridges and the connecting bridges have pocket sides which delimit the pocket. Furthermore, the circumferential bridges and the connecting bridges, which are disposed in the region of the first circumferential end and of the second circumferential end, have circumferential sides opposing the pocket sides. The connecting bridges disposed in the region of the first circumferential end and of the second circumferential end each have a concavely-shaped guide surface on their pocket side and on their circumferential side for partially enclosing a rolling element in its circumferential direction. The circumferential bridges protrude maximally so far over the first circumferential end and the second circumferential end that they cannot touch the circumferential bridge of a further, identically formed cage segment, if a rolling element formed for accommodation in the pocket is disposed between the first circumferential end of the cage segment and the second circumferential end of the further cage segment, and the cage segment, the further cage segment, and the rolling element are disposed in a manner which corresponds to the installed state in the tapered roller bearing.

Only those regions are respectively considered for the first guide surface and for the second guide surface which can touch the outer surface of a rolling element in the operating state of the tapered roller bearing without a deformation of the cage segment.

The inventive cage segment has the advantage that it is suited for use in very large tapered roller bearings and withstands the loads occurring there. Furthermore, the cage segment is characterized by a good installability with simultaneous low costs and low weight. The pocket shape makes possible a secure accommodation of the rolling element and a reliable guiding of the cage segment on the rolling element.

The connecting bridges can each have a concavely-shaped second guide surface on their pocket side for partially enclosing a rolling element in its circumferential direction. This has the advantage that the guiding conditions are precisely specified.

In an embodiment variant, the inventive cage segment of a tapered roller bearing includes two mutually opposing circumferential bridges, which each extend between a first circumferential end and a second circumferential end of the cage segment. Furthermore, the cage segment includes at least two mutually opposing connecting bridges, which connect the two circumferential bridges to each other and form, together with the circumferential bridges, at least one pocket for accommodating a conical rolling element. The circumferential bridges and the connecting bridges have pocket sides which delimit the pocket. Furthermore, the circumferential bridges and the connecting bridges, which are disposed in the region of the first circumferential end and the second circumferential end, have circumferential sides opposing the pocket sides. The connecting bridges each have a concavely-shaped first guide surface and a concavely-shaped second guide surface on their pocket side, and the connecting bridges disposed in the region of the first circumferential end or of the second circumferential end each additionally have a concavely-shaped first guide surface on their circumferential side for partially enclosing a rolling element in its circumferential direction. The first guide surfaces and the second guide surfaces on the pocket sides of the connecting bridges, which delimit the same pockets, secure a rolling element disposed in this pocket against falling out in a first direction, and secure it in an interference-fit manner in a second direction opposite to the first direction and thereby captively fix the rolling element in the pocket.

The installation of the tapered roller bearing is greatly facilitated by the captive fixing of the rolling element.

The first guide surfaces and the second guide surfaces can be formed for a sliding contact with the rolling element. The first guide surfaces can secure the rolling element against falling out in the first direction. The first guide surfaces can in particular secure the rolling element exclusively against falling out in the first direction. In an analogous manner the second guide surfaces can secure the rolling element against falling out in the second direction, in particular exclusively in the second direction. The first guide surfaces can each enclose a larger circumferential region of the rolling element than the second guide surfaces. In addition, the first guide surfaces on the pocket sides of the connecting bridges can each protrude further into the pockets than the second guide surfaces. It is also possible to form second guide surfaces on the circumferential sides of the connecting bridges. The first guide surfaces can extend on the circumferential sides of the connecting bridges over a large part, in particular over at least 90%, of the length of the connecting bridges. Likewise, however, it is also possible to form second guide surfaces on the circumferential sides of the connecting bridges.

The connecting bridges can have different lengths. Here, the first guide surfaces can each be disposed closer to the longer circumferential bridge than the second guide surfaces, and the second guide surfaces can each be disposed closer to the shorter circumferential bridge than the first guide surfaces.

The circumferential bridges and the connecting bridges can each have inner raceway sides, which in the installed state of the cage segment each point towards an inner rolling-element raceway of the tapered roller bearing, and outer raceway sides, which in the installed state of the cage segment each point towards an outer rolling-element raceway of the tapered roller bearing. The inner raceway sides and/or the outer raceway sides of the circumferential bridges can each be formed in the region of the same pocket as flat surfaces. The inner raceway sides and/or the outer raceway sides of the connecting bridges can be formed as flat surfaces. The inner raceway sides of all circumferential bridges, and those connecting bridges which delimit the same pocket, can each have a partial surface which is formed as a component of a common plane. The outer raceway sides of all circumferential bridges, and those connecting bridges which delimit the same pocket, can each have a partial surface which is formed as a component of a common plane.

The cage segment can have exactly one pocket. A cage segment so formed is characterized by a particularly high mechanical stability and a very universal applicability.

The connecting bridges can each have a cavity. The cavity can be formed open to the surroundings. In addition, the cavity can in each case be disposed between the first guide surfaces of the same connecting bridge. The maximum occurring material thickness, and thus also the variation of the material thickness, can be reduced by the cavity.

The cage segment can be manufactured from plastic. A cage segment so formed is characterized in particular by its low weight, its economical manufacture, and comparatively high flexibility. In particular, the cage segment can be manufactured from polyphenylene sulfide or from polyether ether ketone. Both materials are characterized by a very good resistance to aging and a long service life, so that the cage segment can be used over a very long period of operation.

The first guide surfaces on the circumferential sides of the connecting bridges can be formed in an analogous manner, with respect to shape and arrangement, to the first guide surfaces on the pocket sides of the connecting bridges. The first guide surfaces on the circumferential sides of the connecting bridges can be disposed offset to the first guide surfaces on the pocket sides of the connecting bridges. In particular, the first guide surfaces on the circumferential sides of the connecting bridges can be offset towards the first guide surfaces on the pocket sides of the connecting bridges for the inner rolling element raceway of the tapered roller bearing.

All of the connecting bridges can be identically formed on their pocket sides.

The circumferential bridges can each begin at one of the connecting bridges and end at one of the connecting bridges.

The first guide surface and the second guide surface can enclose, on the pocket side of the same connecting bridge, a rolling element disposed in the pocket in different circumferential regions and/or in different axial regions. The circumferential regions can overlap with one another less than 5%, in particular less than 1%, of the maximum total circumference of the rolling element and/or the axial regions can overlap one another less than 50%, in particular less than 10%, of the length of the connecting bridge. In particular, the circumferential regions cannot overlap with one another and/or the axial regions cannot overlap with one another.

First projections for supporting the cage segment on an inner rolling-element raceway of the tapered roller bearing and/or second projections for supporting the cage segment on an outer rolling-element raceway of the tapered roller bearing can be formed on the connecting bridges. In particular, the support occurs in each case only temporarily. A support can occur, for example, with a large load occurring in an impulse-like manner, or in the stationary state of the tapered roller bearing. The slippage behavior and the dry-running running properties can thus be substantially improved.

The cage segment can be formed such that a first region, within which the first projections extend between the two circumferential bridges, and a second region, within which the second projections extend between the two circumferential bridges, do not overlap with each other.

The cage segment can have a marking for explicit identification of the installation position. This facilitates the correct-position installation of the cage segment in the tapered roller bearing.

The invention further relates to a tapered roller bearing for rotatably supporting a first machine part relative to a second machine part. The tapered roller bearing includes conical rolling elements which each have an axis of rotation. Furthermore, the tapered roller bearing includes cage segments, which each accommodate at least one rolling element and which each have a first circumferential end and a second circumferential end. The axes of rotation of all rolling elements are disposed on a common conical surface. The cage segments are disposed in a row one after another in the circumferential direction such that between each two cage segments a rolling element is respectively disposed, which is not accommodated in a cage segment and which permanently prevents a touching contact of these two cage segments with each other.

A tapered roller bearing so formed is characterized by good running properties and a long service life.

The cage segments can each have a concavely-shaped first guide surface in the region of their first circumferential end and their second circumferential end, which first guide surface partially encloses the rolling element, disposed between the cage segments, in its circumferential direction.

The cage segments can be guided by rolling elements. This has the advantage that a very precise and low-wear guidance is possible.

The individual cage segments are preferably not mechanically connected to one another. This has the advantage that the cage segments are displaceable relative to one another, so that a deformation and increased friction occurring with it, as well as increased wear, can be avoided.

BRIEF DESCRIPTION OF THE DRAWINGS

The invention is explained below with reference to the exemplary embodiment shown in the drawing.

DETAILED DESCRIPTION OF THE INVENTION

Figure 1:
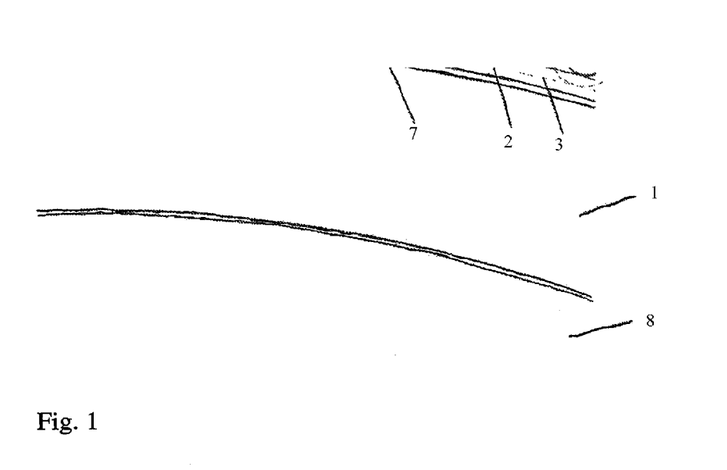
FIG. 1 shows an exemplary embodiment of an inventively formed tapered roller bearing in perspective view.

FIG. 1 shows an exemplary embodiment of an inventively formed tapered roller bearing in perspective view.

The tapered roller bearing includes an inner ring 1 having a contact flange 2 and a conical inner rolling element raceway 3. In the illustration of FIG. 1, the inner rolling element raceway 3 is concealed by the contact flange 2. Furthermore, the tapered roller bearing includes an outer ring 4 having a conical outer rolling element raceway 5. Moreover, the tapered roller bearing includes a set of conical rolling elements 6, which roll on the inner rolling element raceway 3 and on the outer rolling element raceway 5. Here the rolling elements 6 rotate about their rotational axes, which are not represented in the Figures; the rolling elements 6 are rotationally symmetrically formed with respect to the rotational axes. In addition the rolling elements 6 contact the contact flange 2 axially relative to their axes of rotation. The tapered roller bearing also includes a plurality of cage segments 7, which in the illustrated exemplary embodiment each contain one rolling element 6.

However, only every second rolling element 6 is disposed in a cage segment 7, so that a cage segment 7 with a rolling element 6 and a rolling element 6 without cage segment 7 each follow one another alternately in the circumferential direction of the tapered roller bearing. Each of the cage segments 7 which follow one another in the circumferential direction are held permanently spaced from each other by a rolling element 6. This means that the cage segments 7 do not touch one another regardless of the particular operating state of the tapered roller bearing.

The cage segments 7 are guided by the rolling elements, i.e. they are supported on the rolling elements 6. In fact in most operating situations of the tapered roller bearing, the cage segments 7 are exclusively guided by the rolling elements, i.e. there is no touching contact between the cage segments 7 and the inner rolling element raceways 3 or the outer rolling element raceways 5 or other components of the inner ring 1 or of the outer ring 4. Details for forming the cage segments 7 will be explained with reference to FIGS. 2, 3, 4, 5, and 6.

In the illustrated exemplary embodiment, the inner ring 1 is disposed on a shaft 8. The shaft 8 can be in particular a rotor shaft of a wind turbine. The outer ring 4 is disposed in a housing 9, which can be in particular a component of a rotor bearing of a wind turbine.

Figure 2:
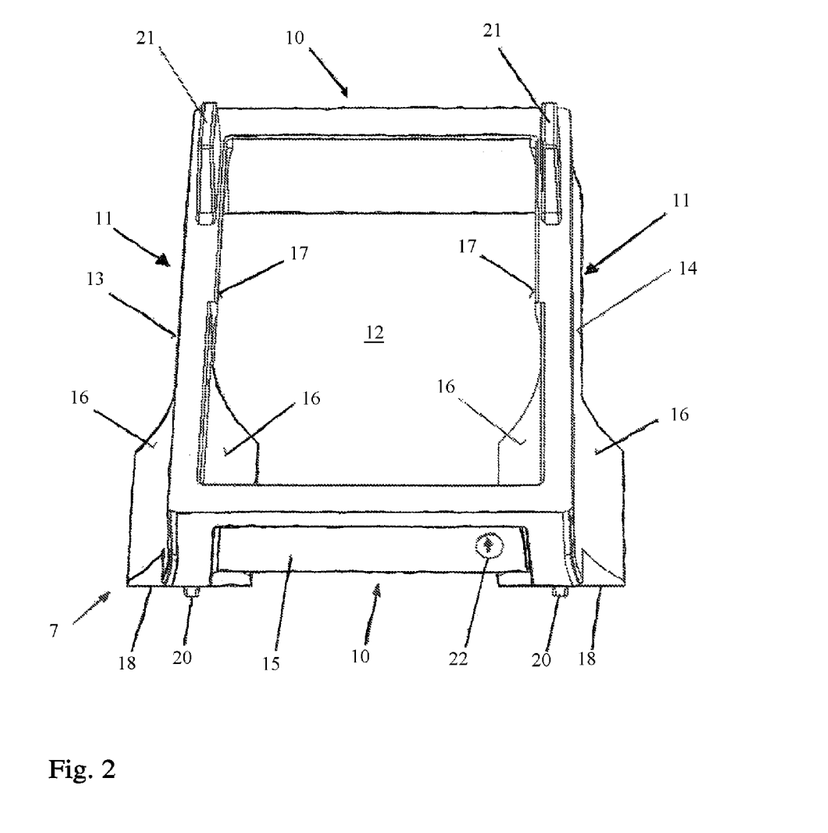
FIG. 2 shows an exemplary embodiment of the cage segment in a perspective view.
Figure 3:
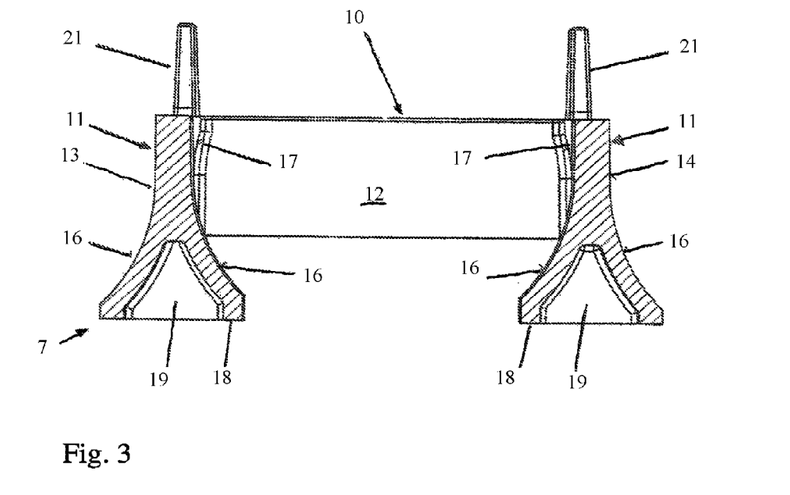
FIG. 3 shows the exemplary embodiment of the cage segment depicted in FIG. 2 in a sectional view.
Figure 4:
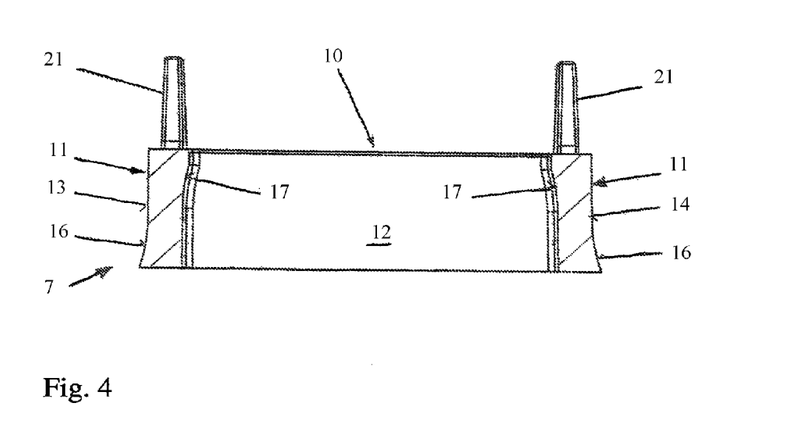
FIG. 4 shows the exemplary embodiment of the cage segment depicted in FIG. 2 in a further sectional view.

FIG. 2 shows an exemplary embodiment of the cage segment 7 in a perspective view. FIG. 3 and FIG. 4 each show the exemplary embodiment illustrated in FIG. 2 in a sectional view with respect to different sectional planes. The illustration in the FIGS. 2 to 4 is respectively chosen such that if the cage segment 7 were installed in the tapered roller bearing in the illustrated state, the inner rolling element raceway 3 would extend below the cage segment 7, and the outer rolling element raceway 5 would extend above the cage segment 7.

The cage segment 7 includes two circumferential bridges 10, disposed at a spacing to each other and oriented parallel to each other, which, in the installed state of the cage segment 7, extend in the circumferential direction of the tapered roller bearing.

Furthermore, the cage segment 7 includes two spaced-apart connecting bridges 11, which form a non-zero angle with each other and connect the two circumferential bridges 10 with each other. In this way a pocket 12 is formed for accommodating a rolling element 6. Due to the non-parallel extension of the connecting bridges 11, the two circumferential bridges 10 have different lengths, and the pocket 12 has the form of an isosceles trapezoid. The outer dimension of the circumferential bridge 10 from a first circumferential end 13 to a second circumferential end 14 of the cage segment 7 is viewed as the length of the circumferential bridge 10. If the first circumferential end 13 and the second circumferential end 14 of the circumferential bridge 10 are not oriented parallel to each other, the arithmetic mean of the outer dimension can be used in each case. In FIG. 2, the circumferential bridge 10 illustrated in the foreground is longer than the circumferential bridge 10 illustrated in the background.

The sides of the circumferential bridges 10 and of the connecting bridges 11, which delimit the pocket 12, are referred to in the following as pocket sides. In an analogous manner the sides of the circumferential bridges 10 and connecting bridges 11 opposite the pocket sides are also referred to in the following as circumferential sides, since these do not delimit a further pocket 12. This condition is generally fulfilled with the circumferential bridges 10, unless it is a multiple-row cage segment 7, wherein a plurality of rolling elements 6 are disposed axially one-behind-the-other. This condition is then respectively fulfilled with the connecting bridges 11 if the respective connecting bridge 11 is disposed in the region of the first circumferential end 13 or of the second circumferential end 14 of the cage segment 7, i.e. for the first connecting bridge 11 and the last connecting bridge 11 of the cage segment 7 based on the circumferential direction of the tapered roller bearing. Since the exemplary embodiment of the cage segment 7 illustrated in FIGS. 2 to 4 has only a single pocket 12, in this exemplary embodiment each circumferential bridge 10 and each connecting bridge 11 respectively has a pocket side and a circumferential side.

As already mentioned, if the cage segment 7 has more than one pocket 12, the circumferential bridges 10 of a single-row cage segment 7 then also each have a pocket side and a circumferential side. In contrast, in such a case the connecting bridges 11 can each have either one or two pocket sides, and thus can have either one or no circumferential sides. A connecting bridge 11 which is disposed between two pockets 12 has two pocket sides and no circumferential sides. A terminal connecting bridge 11 in the circumferential direction, which delimits only a single pocket 12, has a pocket side and a circumferential side.

In addition to the pocket sides and optionally the circumferential sides, the circumferential bridges 10 and the connecting bridges 11 each have an inner raceway side, which in the installed state faces towards the inner rolling element raceway 3 of the tapered roller bearing, and an outer raceway side, which in the installed state faces towards the outer rolling element raceway 5 of the tapered roller bearing. In FIGS. 2 to 4 the inner raceway side corresponds to the underside, and the outer raceway side to the upper side of the circumferential bridges 10 and of the connecting bridges 11.

In the exemplary embodiment of the cage segment 7 shown in FIGS. 2 to 4, the inner raceway sides and the outer raceway sides of the circumferential bridges 10 and of the connecting bridges 11 are each formed as a flat surface. In addition, all inner raceway sides of the circumferential bridges 10 and of the connecting bridges 11 each have a partial surface, which is formed as a component of a common plane. Likewise, all outer raceway sides of the circumferential bridges 10 and of the connecting bridges 11 each have a partial surface, which is formed as a component of a common plane. In exemplary embodiments in which the cage segment 7 has a plurality of pockets 12, this applies at least to the inner raceway sides and the outer raceway sides of the circumferential bridges 10, and those connecting bridges 11 which delimit the same pocket 12.

The circumferential bridges 10 are in particular formed as one-piece with the connecting bridges 11. This one-piece embodiment can be achieved for example by a manufacturing of the cage segment 7 as a plastic injection-molded part. In addition, the circumferential bridges 10 and the connecting bridges 11 end in the region of the first circumferential end 13 and of the second circumferential end 14 with their circumferential sides flush with one another, i.e. neither do the circumferential bridges 10 protrude beyond the connecting bridges 11, nor do the connecting bridges 11 protrude outward beyond the circumferential bridges 10.

The circumferential bridges 10 each have a large-area recess 15 on their circumferential sides, which recess 15 extends over the largest part of the circumferential sides and is framed on three sides in a U-shaped manner. Each recess 15 is open towards the lower raceway side of the circumferential bridge 10. As viewed from the recess 15, the circumferential bridges 10 each have a substantially rectangular cross section.

The connecting bridges 11 each have, both on their pocket sides as well as on their circumferential sides, a first guide surface 16 for sliding guidance of the cage segment 7 on a rolling element 6 disposed inside the cage segment 7, and on two rolling elements 6 disposed directly adjacent on both sides of the cage segment 7. Furthermore, the connecting bridges 11 have, on their pocket sides, a second guide surface 17 for sliding guidance of the cage segment 7 on the rolling element 6 disposed inside the cage segment 7. Only those regions are respectively considered, for the first guide surface 16 and for the second guide surface 17, which can touch the outer surface of a rolling element 6 in the operating state of the tapered roller bearing without a deformation of the cage segment 7. The first guide surface 16 and the second guide surface 17 each do not extend over the entire length of the connecting bridge 11, rather only over a partial area, for example over at most half of the length of the connecting bridge 11. The entire extension of the connecting bridges 11 between the circumferential bridges 10 is viewed as the length of the connecting bridges 11. Here the second guide surface 17 is respectively disposed adjacent to the first guide surface 16 in such a way that the first guide surface 16 and the second guide surface 17 do not, or only slightly, overlap with each other along the length direction of the connecting bridge 11. In other words, the first guide surface 16 and the second guide surface 17 are formed in axial regions of a rolling element 6 disposed in the cage segment 7, which axial regions do not, or only partially, in particular only slightly, overlap with each other. For example, the first guide surface 16 and the second guide surface 17 overlap by less than 50%, in particular by less than 10%, of the length of the connecting bridge 11. The first guide surface 16 is disposed adjacent to the longer connecting bridge 10 or in the vicinity thereof; the second guide surface 17 is disposed adjacent to the shorter connecting bridge 10 or in the vicinity thereof. In other words, the first guide surface 16 is disposed closer to the longer connecting bridge 10 than the second guide surface 17, and the second guide surface 17 is disposed closer to the shorter connecting bridge 10 than the first guide surface 16.

The first guide surfaces 16 are formed on the pocket side and on the circumferential side of the connecting bridge 11 in an analogous way with respect to arrangement and shape. By an "analogous embodiment" a qualitatively, but not necessarily quantitatively identical embodiment is understood. For example, the first guide surface 16 is slightly shifted on the circumferential side of the connecting bridge 11 towards the first guide surface 16 on the pocket side of the same connecting bridge 11. This has as a consequence more favorable guiding conditions with respect to the required offset between adjacent rolling elements 6 due to the curvature of the inner rolling element raceway 3 and the outer rolling element raceway 5. An analogous shape of the first guide surfaces 16 means that the qualitative progression of the curve of the first guide surfaces 16 match, not necessarily however that their radii of curvature match. However, identical radii of curvature are provided in the illustrated exemplary embodiment, and are also appropriate in many other cases. The first guide surfaces 16 and the second guide surfaces 17 each have a concave shape, so that they respectively enclose in certain areas one of the rolling elements 6 disposed in the pocket 12 of the cage segment 7, as well as, in the case of the first guide surfaces 16, the rolling element 6 disposed on both sides directly adjacent to the cage segment 7.

In addition, the first guide surfaces 16 and the second guide surfaces 17 are each disposed offset to one another such that they guide a rolling element 6, disposed in the pocket 12, in different circumferential regions, or with the reverse perspective are supported on different circumferential regions of the rolling element 6. In particular, it can be provided that these different circumferential regions do not or only slightly overlap with each other. For example, the circumferential regions can overlap by less than 5% or by less than 1% of the maximum total circumference of the rolling element 6. In the illustrated exemplary embodiment, the first guide surfaces 16 protrude with increasing proximity to the inner raceway side and, in addition, increasingly protrude, and the second guide surfaces 17 increasingly protrude with increasing proximity to the outer raceway side. Accordingly, when proceeding in the stated direction, the first guide surfaces 16 and second guide surfaces 17 formed on the pocket sides of the connecting bridges 11 increasingly protrude into the region of the pocket 12. This means that a rolling element 6 inserted in the pocket 12 is secured against falling out of the pocket 12 on the inner raceway side by the first guide surfaces 16, and on the outer raceway side by the second guide surfaces 17. Thus the rolling element 6 is secured on all sides against falling out, and thus is captively disposed in the pocket 12 of the cage segment 7.

As can be seen from FIGS. 2 and 3, each first guide surface 16 is much more pronounced than each second guide surface 17. In order to make this strong pronouncement of the first guide surface 16 possible, a bridge extension 18 is formed on the connecting bridge 11, which bridge extension 18 protrudes over the inner raceway side and progressively thickens with increasing distance from the inner raceway side. The bridge extension 18 has a cavity 19 which is open on the free end of the bridge extension 18. The material thickness of the bridge extension 18 is reduced by the cavity 19, and approximates the material thickness in other regions of the cage segment 7.

Furthermore, a first projection 20 is formed in the region of the free end of the bridge extension 18, which first projection 20 protrudes beyond the end surface of the bridge extension 18. A second projection 21 is disposed on the raceway side of the connecting bridge 11 in the region in which the second guide region 16 is formed. In the installed state of the cage segment 7, the first projection 20 extends towards the inner rolling element raceway 3, but does not touch it when the tapered roller bearing rotates under normal conditions. In an analogous manner the second projection 21 extends towards the outer rolling element raceway 5, but does not touch it when the tapered roller bearing rotates under normal conditions. On the other hand, if the tapered roller bearing is subjected to a strong impulse-shaped load, a contact can result between the first projection 20 and the inner rolling element raceway 3 or between the second projection 21 and the outer rolling element raceway 5. The same applies if the tapered roller bearing is not rotating.

In order to facilitate the proper-position installation in the tapered roller bearing, the cage segment 7 has a marking 22 in the region of the recess 15.

Alternatively to the exemplary embodiment illustrated in FIGS. 2 to 4, the cage segment 7 can also have more than one pocket 12 and thus can accommodate a plurality of rolling elements 6. For example, in an alternative embodiment the cage segment 7 can have two pockets 12, which accommodate two rolling elements 6. The two pockets 12 are formed by two circumferential bridges 10 and three connecting bridges 11. Two of the connecting bridges 11, which are formed in the region of the first circumferential end 13 or in the region of the second circumferential end 14 of the cage segment 7, each have a pocket side and a circumferential side. The third connecting bridge 11, which is disposed between the terminal connecting bridges 11, has two pocket sides and no circumferential side therefor.

Figure 5:
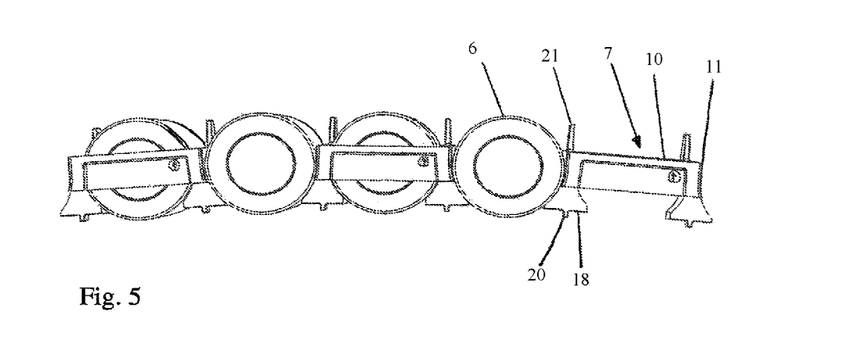
FIG. 5 shows an assembly of rolling elements, and cage segments formed according to FIGS. 2 to 4 in perspective view.
Figure 6:
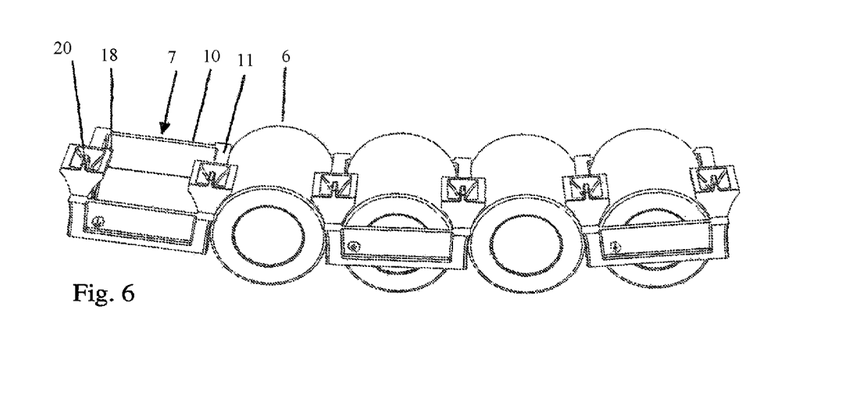
FIG. 6 shows the assembly represented in FIG. 5 in a further perspective view.

FIG. 5 shows an arrangement of rolling elements 6 and cage segments 7 formed according to FIGS. 2 to 4 in a perspective illustration. FIG. 6 shows the same arrangement with another perspective. The illustrated arrangement corresponds to the installation situation in the tapered roller bearing. Accordingly, a cage segment 7 with a rolling element 6 and a rolling element 6 without a cage segment 7 are respectively adjacently disposed in an alternating sequence. Since the rolling elements 6 respectively partially cover the cage segments 7, one cage segment 7 without a rolling element 6 is particularly shown. However, in the installed state, all cage segments 7 actually have a rolling element 6.

The circumferential bridges 10 of different cage segments 7 each form an angle with each other. In particular, the inner raceway sides of the circumferential bridges 10 of different cage segments 7 each form a non-zero angle with each other. Likewise, the outer raceway sides of the circumferential bridges 10 of different cage segments 7 each form a non-zero angle with each other. In an exemplary embodiment of cage segment 7, which has a plurality of pockets 12, it is also possible that the inner raceway sides and/or the outer raceway sides of the circumferential bridges 10 each have a polygon shape, and thus sections of the raceway sides, which are disposed in the region of different pockets 12 of the cage segment 7, form a non-zero angle with each other. As can be seen from FIGS. 5 and 6, the slight offset between the first guide surfaces 16 on the pocket side and on the circumferential side of the same connecting bridge 11 makes possible the curvature of the inner rolling element raceway 3 and the outer rolling element raceway 5 without recreating a severe variation of the guiding properties.

In addition, the geometry of the cage segments 7, in particular of the first guide surface 16 and of the second guide surface 17, is matched to the rolling elements 6 such that in the rotating state of the tapered roller bearing the cage segments 7 are supported by the rolling elements 6 and touch neither the inner rolling element raceway 3 nor the outer rolling element raceway 5. This means that the tapered roller bearing is guided by the rolling elements. However, between the inner rolling element raceway 3 and the first projections 20 of the cage segments 7, as well as between the outer rolling element raceway 5 and the second projections 21 of the cage segment 7, only a slight clear spacing is respectively formed, so that in case of a strong impulse-shaped load or in the stationary state of the tapered roller bearing, a touching contact between cage segments 7 and the inner rolling element raceway 3 or the outer rolling element raceway 5 can result. This contact is formed in the region of the first projections 20 or the second projections 21 of the cages segments 7, so that in such a situation the cage segments 7 are supported by the first projection 20 on the inner rolling element raceway 3 or by the second projections 21 on the outer rolling element raceway 5. When this particular situation has ended, the touching contact of the cage segments 7 with the inner rolling element raceway 3 or with the outer rolling element raceway 5 is also eliminated again and a pure rolling guidance again occurs. This means that the first projections 20 and the second projections 21 perform a support function for the cage segments 7 in extreme situations. This support function can also be provided in the case of excessive wear of the cage segments 7, in order to replace the rolling element bearing guidance, which is no longer present to a sufficient degree, of the cage segment 7.

REFERENCE NUMBERS

1 Inner ring
2 Contact flange
3 Inner rolling element raceway
4 Outer ring
5 Outer rolling element raceway
6 Rolling element
7 Cage segment
8 Shaft
9 Housing
10 Circumferential bridge
11 Connecting bridge
12 Pocket
13 First circumferential end
14 Second circumferential end
15 Recess
16 First guide surface
17 Second guide surface
18 Bridge extension
19 Cavity
20 First projection
21 Second projection
22 Marking

The invention claimed is:

1. A tapered roller bearing configured to rotatably support a first machine part relative to a second machine part, the tapered roller bearing comprising:
   a plurality of conical roller elements and
   a plurality of cage segments, each having:
   two mutually-opposing circumferential bridges, which each extend between a first circumferential end and a second circumferential end of the cage segment, and
   at least two mutually-opposing connecting bridges, which connect the two circumferential bridges to each other and, together with the circumferential bridges, form a pocket that accommodates one of the conical rolling elements,
   wherein:
   the circumferential bridges and the connecting bridges respectively have pocket sides, which delimit the pocket,
   the connecting bridges, which are disposed in the region of the first circumferential end and of the second circumferential end, and the circumferential bridges respectively have circumferential sides opposite of the pocket sides, a concavely-shaped first guide surface and a concavely-shaped second guide surface is defined on the pocket side of each connecting bridge, a concavely-shaped first guide surface configured to partially enclose one of the conical rolling elements in its circumferential direction is also defined on the circumferential side of each connecting bridge and is disposed in the region of the first circumferential end or of the second circumferential end, the first guide surface and the second guide surface on the pocket side of each connecting bridge, which delimit the same pocket, secure the rolling element disposed in the pocket against falling out in a first direction, and secure the rolling element in an interference-fit manner in a second direction opposite to the first direction and thereby captively retain the rolling element in the pocket and wherein the cage segments are roller element guided.

2. The tapered roller bearing according to claim 1, wherein the first guide surface on the circumferential sides of the connecting bridges are formed in an analogous manner, with respect to shape and arrangement, to the first guide surface on the pocket sides of the connecting bridges.

3. The tapered roller bearing according to claim 2, wherein the pocket sides of all connecting bridges are identically formed.

4. The tapered roller bearing according to claim 3, wherein the circumferential bridges each begin on one of the connecting bridges and end on one of the connecting bridges.

5. The tapered roller bearing according to claim 4, wherein the first guide surface and the second guide surface on the pocket side of the same connecting bridge enclose one rolling element disposed in the pocket indifferent circumferential regions and/or in different axial regions.

6. The tapered roller bearing according to claim 5, wherein the connecting bridges have formed thereon:
first projections configured to support the cage segment on an inner rolling element raceway of the tapered roller bearing and/or
second projections configured to support the cage segment on an outer rolling element raceway of the tapered roller bearing.

7. The tapered roller bearing according to claim 6, wherein a first region, within which the first projections extend between the two circumferential bridges, and a second region, within which the second projections extend between the two circumferential bridges, do not overlap with each other.

8. A tapered roller bearing configured to rotatably support a first machine part relative to a second machine part, the tapered roller bearing comprising:
a plurality of conical roller elements and
a plurality of cage segments, each having:
two mutually-opposing circumferential bridges, which each extend between a first circumferential end and a second circumferential end of the cage segment and
at least two mutually-opposing connecting bridges, which connect the two circumferential bridges to each other and, together with the circumferential bridges, form a pocket that accommodates one of the conical rolling elements,
wherein:
the circumferential bridges and the connecting bridges respectively have pocket sides, which delimit the pocket,
the connecting bridges, which are disposed in the region of the first circumferential end and of the second circumferential end, and the circumferential bridges respectively have circumferential sides opposite of the pocket sides, a concavely-shaped first guide surface configured to partially enclose one conical rolling element in its circumferential direction is defined on the pocket side and on the circumferential side of each connecting bridge and is disposed in the region of the first circumferential end and of the second circumferential end, roller elements are respectively disposed between the first circumferential ends of one of the cage segments and the second circumferential ends of another of the cage segments and the circumferential bridges of the adjacently-disposed cage segments do not touch, and wherein the cage segments are roller element guided.

9. The tapered roller bearing according to claim 8, wherein the pocket side of each connecting bridge has a concavely-shaped guide surface configured to partially enclose one conical rolling element in its circumferential direction.

10. The tapered roller bearing according to claim 8, wherein the first guide surface on the circumferential sides of the connecting bridges are formed in an analogous manner, with respect to shape and arrangement, to the first guide surface on the pocket sides of the connecting bridges.

11. The tapered roller bearing according to claim 8, wherein all connecting bridges are identically formed on their pocket sides.

12. The tapered roller bearing according to claim 8, wherein the circumferential bridges each begin on one of the connecting bridges and end on one of the connecting bridges.

13. The tapered roller bearing according to claim 8, wherein the first guide surface and a second guide surface on the pocket side of the same connecting bridge enclose one rolling element disposed in the pocket in different circumferential regions and/or in different axial regions.

14. The tapered roller bearing according to claim 8, wherein the connecting bridges have formed thereon:
first projections configured to support the cage segment on an inner rolling element raceway of the tapered roller bearing and/or
second projections configured to support the cage segment on an outer rolling element raceway of the tapered roller bearing.

15. The tapered roller bearing according to claim 14, wherein a first region, within which the first projections extend between the two circumferential bridges, and a second region, within which the second projections extend between the two circumferential bridges, do not overlap with each other.

16. A tapered roller bearing configured to rotatably support a first machine part relative to a second machine part, the tapered roller bearing comprising:
a plurality of conical roller elements, each having an axis of rotation,
a plurality of cage segments, each having a pocket that retains at least one of the conical rolling elements and each having a first circumferential end and a second circumferential end,
wherein:
the axes of rotation of all rolling elements are disposed on a common conical surface,
the cage segments are disposed in a row one after another in a circumferential direction such that, between each two adjacent cage segments, one rolling element is respectively disposed that is not retained by one of cage segments and that permanently prevents the two adjacent cage segments from touching each other during operation and wherein the cage segments are roller element guided.

17. The tapered roller bearing according to claim 16, wherein the cage segments each have a concavely-shaped first guide surface in the region of their first circumferential end and of their second circumferential end, the first guide surface partially enclosing the rolling element disposed between two adjacent cage segments in its circumferential direction.

18. The tapered roller bearing according to claim 16, wherein each cage segment has:

two mutually-opposing circumferential bridges, which each extend between the first circumferential end and the second circumferential end of the cage segment, and at least two mutually-opposing connecting bridges, which connect the two circumferential bridges to each other and, together with the circumferential bridges, form the pocket that accommodates one of the conical rolling elements, wherein:

the circumferential bridges and the connecting bridges respectively have pocket sides, which delimit the pocket, the connecting bridges, which are disposed in the region of the first circumferential end and of the second circumferential end, and the circumferential bridges respectively have circumferential sides opposite of the pocket sides, a concavely-shaped first guide surface and a concavely-shaped second guide surface is defined on the pocket side of each connecting bridge, a concavely-shaped first guide surface configured to partially enclose one of the conical rolling elements in its circumferential direction is also defined on the circumferential side of each connecting bridge and is disposed in the region of the first circumferential end or of the second circumferential end, the first guide surface and the second guide surface on the pocket side of each connecting bridge, which delimit the same pocket, secure the rolling element disposed in the pocket against falling out in a first direction, and secure the rolling element in an interference-fit manner in a second direction opposite to the first direction and thereby captively retain the rolling element in the pocket.

19. The tapered roller bearing according to claim 16, wherein each cage segment has:

two mutually-opposing circumferential bridges, which each extend between the first circumferential end and the second circumferential end of the cage segment and at least two mutually-opposing connecting bridges, which connect the two circumferential bridges to each other and, together with the circumferential bridges, form the pocket that accommodates one of the conical rolling elements, wherein:

the circumferential bridges and the connecting bridges respectively have pocket sides, which delimit the pocket, the connecting bridges, which are disposed in the region of the first circumferential end and of the second circumferential end, and the circumferential bridges respectively have circumferential sides opposite of the pocket sides, a concavely-shaped first guide surface configured to partially enclose one conical rolling element in its circumferential direction is defined on the pocket side and on the circumferential side of each connecting bridge and is disposed in the region of the first circumferential end and of the second circumferential end, roller elements are respectively disposed between the first circumferential ends of one of the cage segments and the second circumferential ends of another of the cage segments and the circumferential bridges of the adjacently-disposed cage segments do not touch.

20. The tapered roller bearing according to claim 16, wherein a inner rolling element raceway and a conical outer rolling element raceway are disposed on opposite sides of the rolling elements, and the cage segments are not mechanically connected to one another.

* * * * *